H. B. HOLMES & E. B. CRAFT.
AUTOMATIC EXCHANGE SELECTOR.
APPLICATION FILED MAR. 8, 1906. RENEWED JUNE 11, 1910.
980,417.
Patented Jan. 3, 1911.
4 SHEETS—SHEET 4.
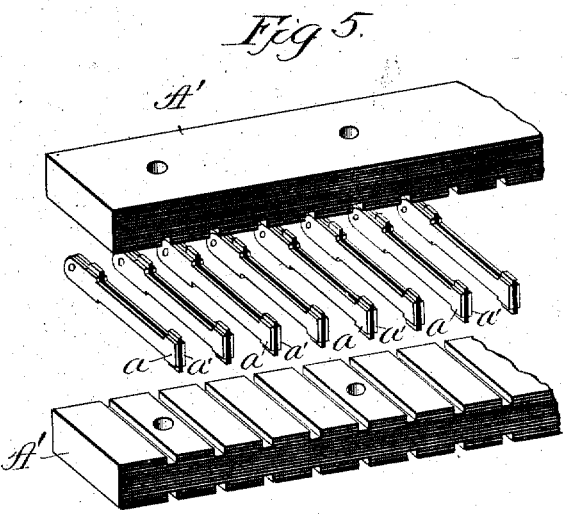
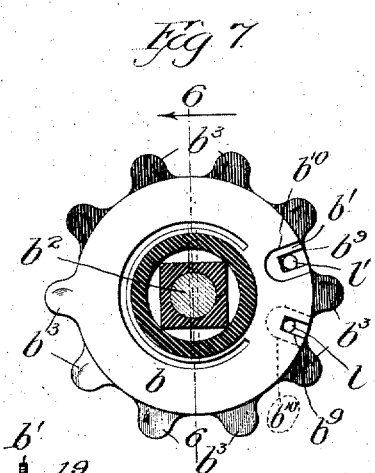
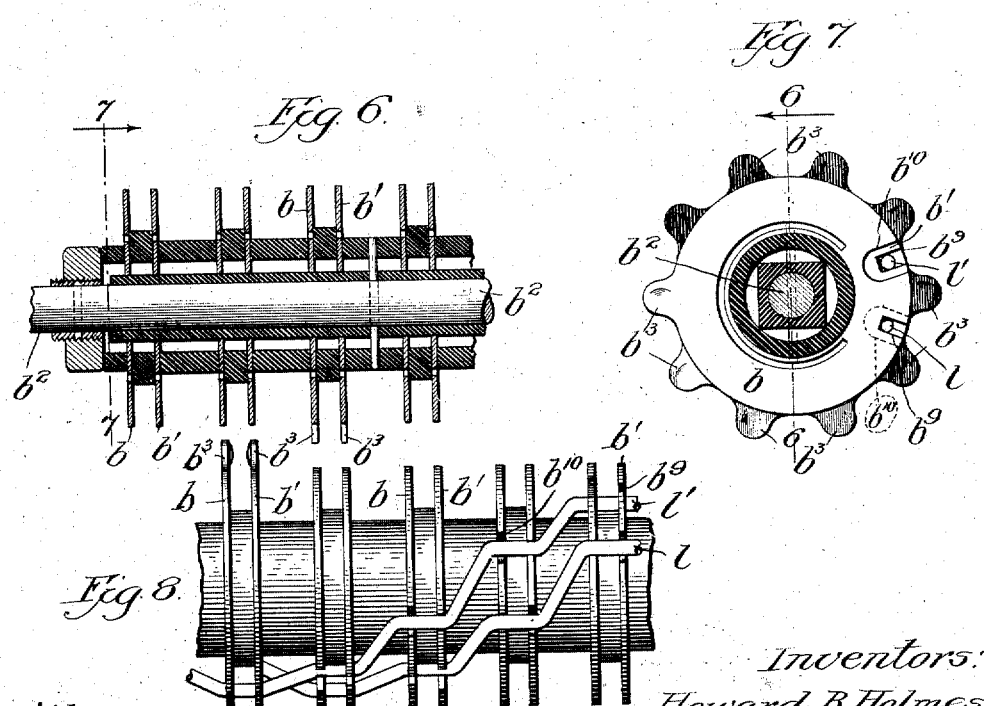
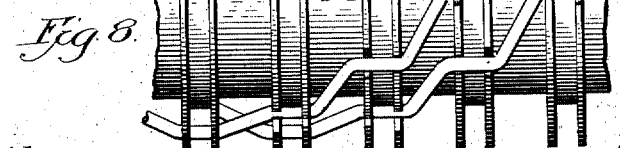
Witnesses:
Inventors:
Howard B. Holmes,
Edward B. Craft,
By Barton & Bennet
Attys.

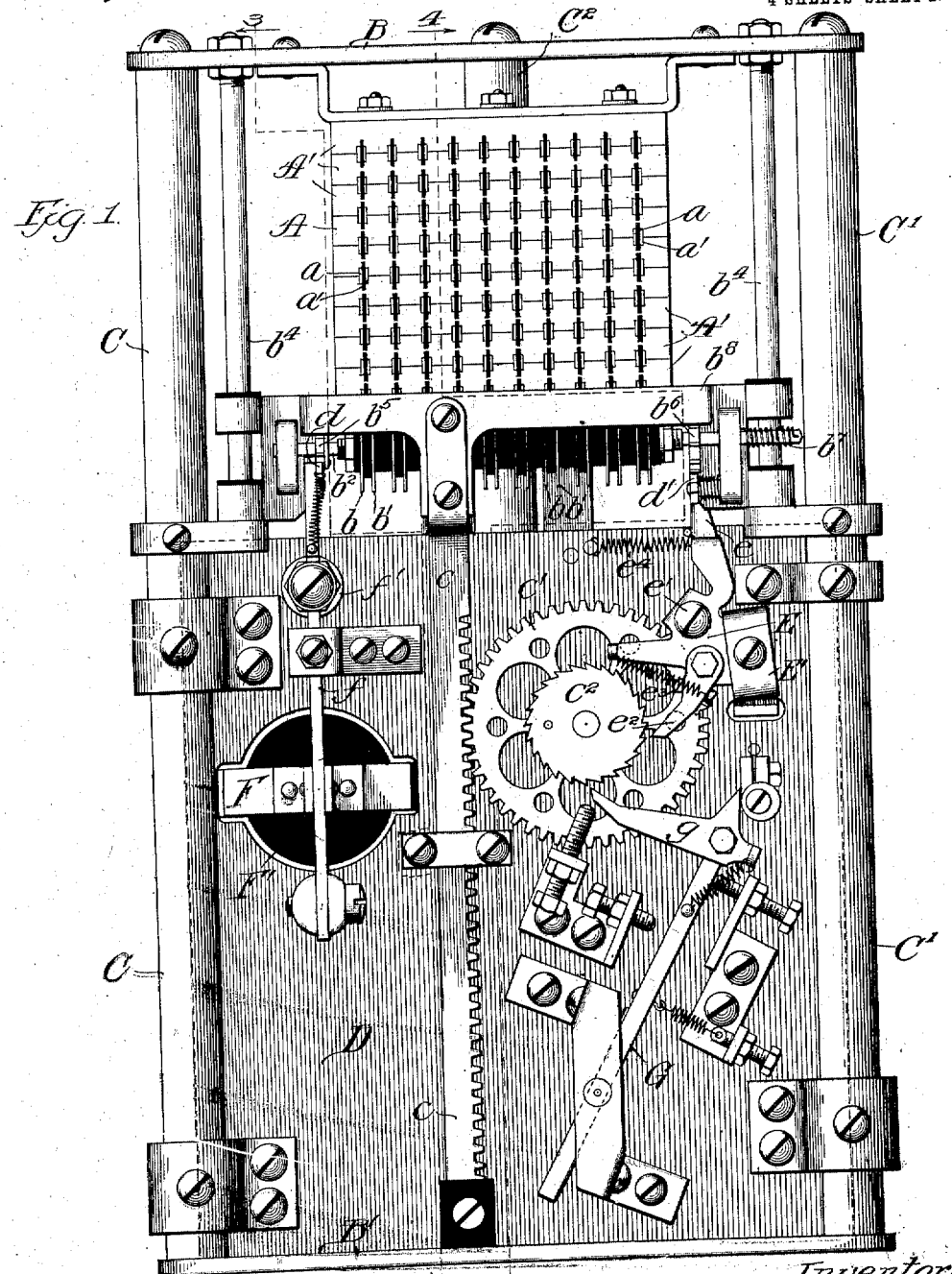

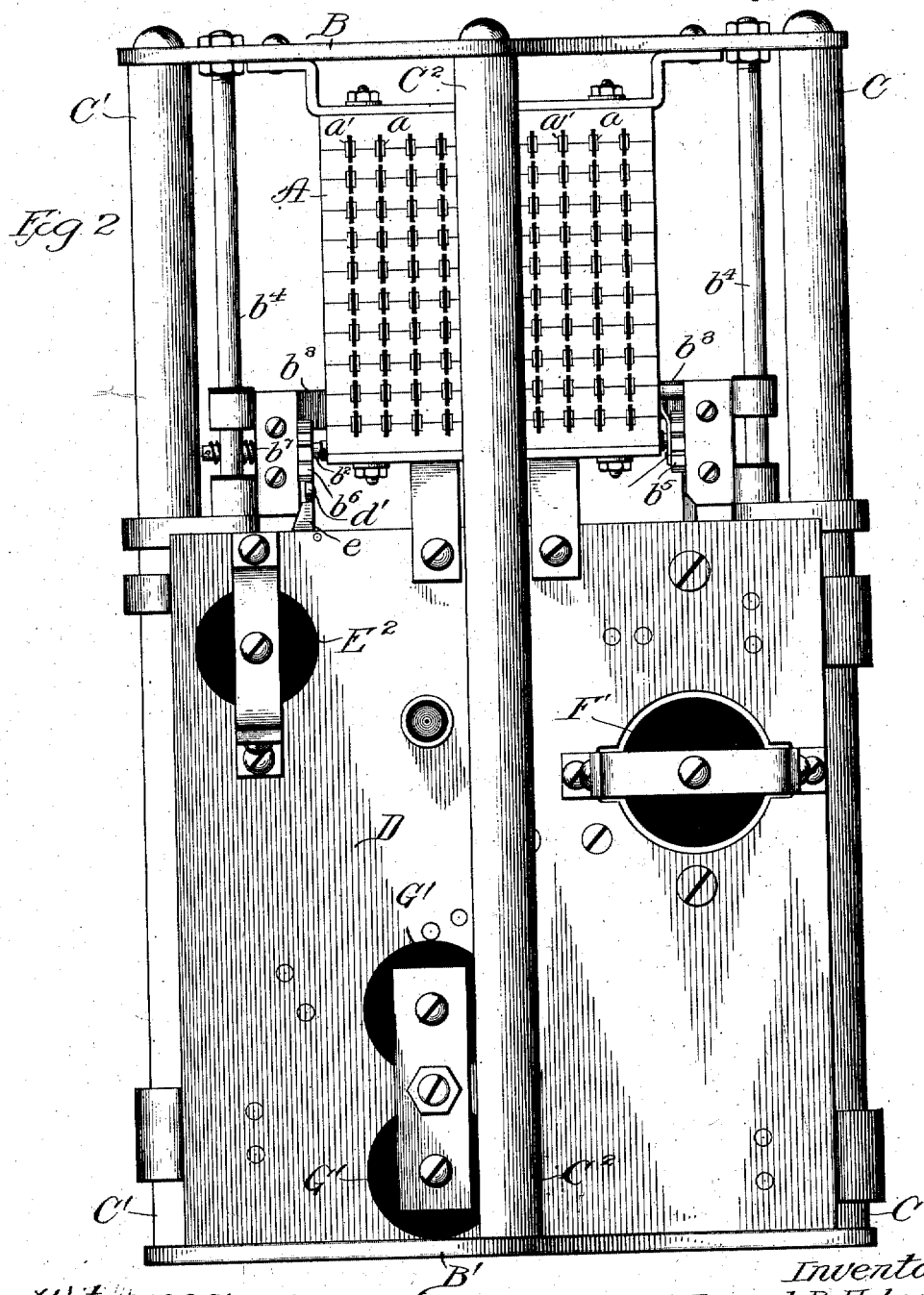

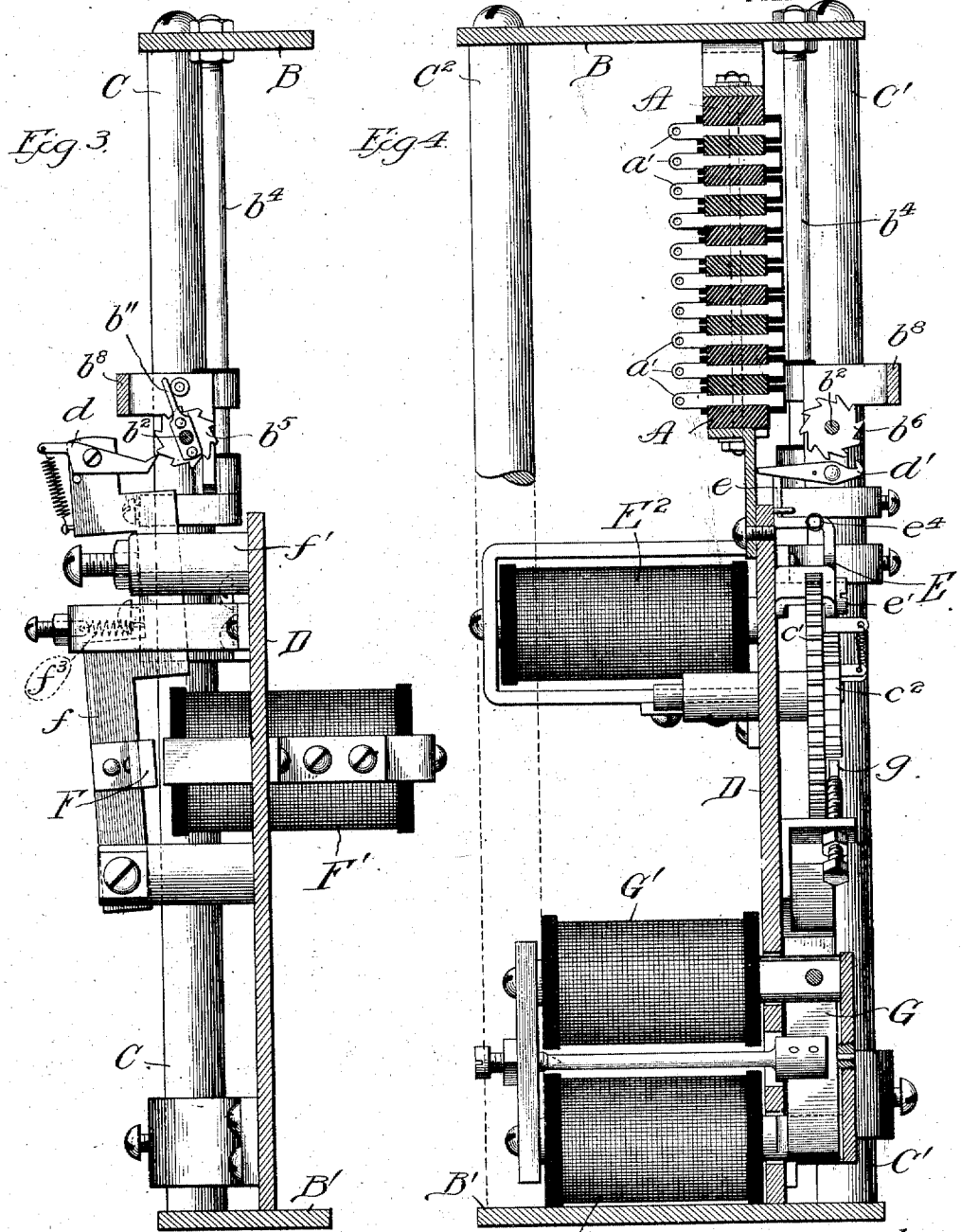

UNITED STATES PATENT OFFICE.

HOWARD B. HOLMES, OF PARK RIDGE, AND EDWARD B. CRAFT, OF CHICAGO, ILLINOIS, ASSIGNORS TO WESTERN ELECTRIC COMPANY, OF CHICAGO, ILLINOIS, A CORPORATION OF ILLINOIS.

AUTOMATIC-EXCHANGE SELECTOR.

980,417.     Specification of Letters Patent.     Patented Jan. 3, 1911.

Application filed March 8, 1906, Serial No. 304,915.   Renewed June 11, 1910.   Serial No. 566,357.

*To all whom it may concern:*

Be it known that we, HOWARD B. HOLMES and EDWARD B. CRAFT, citizens of the United States, residing, respectively, at Park Ridge and at Chicago, in the county of Cook and State of Illinois, have invented a certain new and useful Improvement in Automatic-Exchange Selectors, of which the following is a full, clear, concise, and exact description.

Our invention relates to a selector for an automatic telephone exchange, and its object is to provide simple mechanism for effecting the interconnection of the different lines terminating at the central exchange.

Our improved selector comprises a bank of fixed contacts or line terminals arranged in parallel rows, a group of brushes, wipers or actve contacts corresponding respectively to the different rows of fixed terminals and electrically connected in multiple, said brushes being mounted upon a movable support common to all of them, means for selectively advancing or moving any of said brushes into mechanically coöperative relation with its corresponding row of fixed terminals, and means for imparting to the brush support a movement of translation to carry the selected brush along the corresponding row of terminals. Preferably the selected brush moves with its support over the terminals in the plane of its first-mentioned movement.

In one embodiment of our invention the brushes are in the form of contact disks or wipers and are mounted in a helical line along the periphery of a cylindrical support, which is axially rotatable and also movable bodily along a bank of fixed contacts which are arranged in coördinate horizontal and vertical rows. By a rotary movement of the brush support, any desired brush may be brought into registering position with a corresponding row of fixed contacts, and by bodily moving the support along the bank of terminals the selected brush may be brought into contact with any of the terminals in its row. Where the selector is used for the switching of metallic circuits, the contacts are arranged in pairs or sets and the brushes are arranged and electrically connected in corresponding multiple sets.

We will more fully describe our invention by reference to the accompanying drawings, in which, Figure 1 is a front elevation of a selector embodying our invention; Fig. 2 is a rear elevation thereof; Figs. 3 and 4 are sections on the lines 3—3 and 4—4 respectively of Fig. 1; Fig. 5 is a fragmentary separated view of a portion of the plate of line terminals; Fig. 6 is an enlarged fragmentary sectional view of the rotatable switch member on line 6—6 of Fig. 7; Fig. 7 is an enlarged cross section on the line 7—7 of Fig. 6; Fig. 8 is an enlarged fragmentary view of the switch member showing the method of connecting the disks in multiple.

Similar letters of reference refer to similar parts throughout the views.

In the selector shown in the drawings, the line terminals $a$ $a'$ are arranged in ten vertical rows with ten pairs of line terminals in each row. The mounting plate A for these terminals is made up of a series of horizontal strips or blocks A′ of insulating material having vertical slits in their meeting edges within which the pairs of terminals insulated from each other, are received, each pair of terminals being clamped between two of these blocks. The mounting plate A is secured to the frame of the selector upon brackets or in any other suitable manner.

The frame of the selector illustrated in the drawings consists of two plates B, B′, connected by a plurality of vertical rods C, C′, C². A vertical plate D, secured to the rods C, C′, constitutes a mounting plate for the actuating mechanism of the selector.

It will be understood that there may be a selector for each subscriber's line, the two sides of said line terminating in brushes or disks $b$, $b'$, respectively. The disks $b$ are all electrically connected together, and the disks $b'$, insulated from disks $b$, are likewise connected together, thus forming multiple terminals of the line. These disks are mounted upon a shaft $b^2$ in such manner that they are insulated therefrom. Each disk is provided with a lip $b^3$, which, when in operative position, makes contact with any terminal in the vertical row which it may be opposite. In the drawings ten pairs of disks $b$, $b'$, are shown corresponding to the vertical rows of line terminals. The ten pairs of disks are so arranged on the shaft $b^2$ that the lips of each pair are displaced approximately thirty six degrees with reference to those of the adjacent pairs, said pairs of lips thus extending in a helical formation about the shaft $b^2$. By rotating said shaft the individual pairs of contact lips are successively brought into position for engagement with the corresponding row of line terminals.

The horizontal shaft $b^2$ has bearings in a frame $b^6$, which is slidably mounted on guide rods $b^4$. The vertical movement of the frame $b^8$ is controlled by the rack $c$ and pinion $c'$. Upon the ends of the shaft $b^2$ are ratchets $b^5$, $b^6$, respectively, the former coöperating with a stepping pawl $d$ to intermittently rotate the shaft, and the latter with a retaining pawl $d'$ to hold the shaft in its rotated position. A coiled spring $b^7$ returns the shaft to its normal position upon the disengagement of the pawl $d'$. In the idle position of the disks the contact lips $b^3$ are out of engagement with the terminals $a$, $a'$, but the first pair of lips is in position to engage the first vertical row of terminals when the frame $b^8$, carrying the disks, is raised. If any line terminal other than those in the first vertical row is to be selected, it is first necessary to actuate the shaft $b^2$ to bring the lips $b^3$ of the disk $b$, corresponding to the row in which the desired terminal is located, in position to engage with the terminals of that particular vertical row. As before stated, this is done through the medium of the stepping pawl $d$ and retaining pawl $d'$. We will now consider more fully the mechanism for accomplishing this result. In the normal position of the parts, the pawl $d'$, which is pivoted upon the frame $b^8$, rests upon a lug $e$ projecting upward from the lever E. Said lever is pivoted at $e'$ upon the plate D. A spring pressed retaining pawl $e^2$ pivotally carried by the lever E is normally held, by a lug $e^3$ on said lever, out of engagement with the ratchet $c^2$ mounted to rotate with the pinion $c'$. A spring $e^4$ normally holds the lever E against a stop in such position that the pawl $e^2$ is out of engagement with ratchet $c^2$ and the lug $e$ is beneath the pawl $d'$, holding the same out of engagement with the ratchet $b^6$. Secured upon the lever E is an armature E' of the electromagnet $E^2$. When said magnet is energized it attracts its armature, thereby operating the lever E, so that the lug $e$ is pulled aside, permitting the spring pressed retaining pawl $d'$ to engage the ratchet $b^6$. The shaft $b$ is now prepared to be intermittently rotated by the pawl $d$ and ratchet $b^5$. The pawl $d$ is carried upon the end of a pivoted lever $f$ which moves in a guideway formed by slotting the post $f'$ which projects from the plate D. The outward movement of the lever $f$ is limited by a set screw in the end of said post. Said lever is normally held by a spring $f^3$ in such position that the pawl $d$ is out of engagement. The lever $f$ carries the armature F of the electromagnet F', the energization of which magnet thereby actuates the lever. As is apparent, therefore, for each impulse of current the shaft is partially rotated to bring the next successive pair of disks in operative position. A pin $b^{11}$ carried by the ratchet $b^5$ engages a stop and prevents further rotation of the shaft when the last disk has been brought into position. After the proper vertical row of terminals has been selected, the movable frame $b^8$ carrying the contact disks is raised until the desired line terminals are reached. As before stated, the energization of magnet $E^2$ causes the retaining pawl $e^2$ to engage the ratchet wheel $c^2$ which is mounted to rotate with the pinion $c'$. Said ratchet wheel is adapted to be stepped around by a pawl $g$, carried upon the extended end of the pivoted armature G of the electromagnet G'. For each impulse of current energizing the magnet G', the ratchet $c^2$ is stepped one notch, carrying with it the pinion $c'$ which engages the teeth of the rack $c$, and thereby raises the frame $b^8$. The gearing of said rack and pinion is such that for each impulse of current through the magnet G' the lips $b^3$ of the operating pair of disks $b$, $b'$, are stepped to the next vertical pair of terminals above the same. As long as the magnet $E^2$ is energized the retaining pawl $e^2$ holds the frame $b^8$ in its raised position. Upon the deënergization of said magnet, however, the spring $e^4$ returns the lever E to its normal position shown in Fig. 1, and permits the frame $b^8$ to be returned to its normal position by the action of gravity. In this position of the lever E the stop $e$ is in the path of the pawl $d'$, which is thereupon released from engagement with the ratchet $b^6$, permitting the shaft $b^2$ under the influence of the spring $b^7$ to return the series of disks $b$, $b'$, to their normal positions.

The structure and mounting of the disks $b$, $b'$, are shown most clearly in Figs. 6, 7. As shown therein, said disks are insulated from the shaft $b^2$. In each disk is a slot $b^9$ and an enlarged slot $b^{10}$. In each pair of disks $b$, $b'$, the slots $b^9$ are opposite the slots $b^{10}$. Uninsulated conductors $l$ and $l'$ are placed in said slots, the conductor $l$ fitting closely the slots $b^9$ in the disks $b$ and connecting said disks together, and the conductor $l'$ fitting closely in the slots $b^9$ in the disks $b'$ and likewise connecting them together. Said conductors do not engage the sides of the enlarged slots $b^{10}$, said slots being enlarged for the purpose of preventing the conductors $l$ and $l'$ from contacting with the disks $b'$ and $b$ respectively.

Having thus described a selector of the form in which we prefer to embody our invention, we claim:

1. A selector switch comprising a bank of fixed contacts arranged in parallel rows, a group of brushes corresponding respectively to the different rows of fixed contacts and electrically connected in multiple, a movable support common to said brushes, means for selectively advancing any of said brushes into mechanically coöperative relation to the corresponding row of fixed contacts, and means for imparting to the brush support a movement of translation to carry the selected brush along the corresponding row of fixed contacts.

2. A selector switch comprising a bank of fixed contacts arranged in parallel rows, a group of brushes corresponding respectively to the different rows of fixed contacts and electrically connected in multiple, a movable support common to said brushes, means for selectively advancing any of said brushes into mechanically coöperative relation to the corresponding row of fixed contacts, and means for imparting to the brush support a movement of translation to carry the selected brush along the corresponding row of fixed contacts, in the plane of its first-mentioned movement.

3. A selector switch comprising a bank of fixed contacts arranged in parallel rows and constituting sets of line terminals, a group of brushes corresponding respectively to the different rows of fixed contacts and electrically connected in multiple sets, a movable support common to said brushes, means for selectively advancing any one of said multiple sets of brushes into mechanically coöperative relation to the sets of line terminals in the corresponding rows, and means for imparting to the brush support a movement of translation to carry the selected set of brushes along such corresponding rows of line terminals.

4. A selector switch comprising a bank of fixed contacts arranged in parallel rows and constituting sets of line terminals, a group of brushes corresponding respectively to the different rows of fixed contacts and electrically connected in multiple sets, a movable support common to said brushes, means for selectively advancing any one of said multiple sets of brushes into mechanically coöperative relation to the sets of line terminals in the corresponding rows, and means for imparting to the brush support a movement of translation to carry the selected set of brushes along such corresponding rows of line terminals, in the plane of the first-mentioned movement.

5. A selector switch comprising a plurality of fixed contacts arranged in parallel rows, a series of movable contacts adapted respectively to coöperate with said rows of fixed terminals, a frame carrying a member upon which said contacts are arranged in a helical line, means for imparting a rotary movement to said member, and means for imparting to said frame a movement transverse to the axis of rotation of said member.

6. A selector switch comprising a plurality of fixed contacts arranged equidistant in parallel rows, complementary contacts one for each of said rows, a shaft extending transverse to said rows and supporting said complementary contacts equidistant in a helical line, and means for rotating said shaft and for moving it in the direction of said rows to bring any of said complementary contacts into engagement with any fixed contact in the corresponding row.

7. In an automatic telephone exchange, a selector having a plurality of fixed contacts, a movable group of complementary contacts arranged in a helical line and connected together, means for rotating the group of complementary contacts and for translating the position thereof in a plane parallel with the plane of said fixed contacts.

8. In a selector switch, the combination with a plate having line terminals arranged in pairs in a series of parallel straight rows, of a movable member having a series of pairs of contacts, one pair for each of said rows, means for bringing any particular pair of contacts into operative relation with its corresponding row of terminals, and means for moving said member over the face of said plate into a desired position thereon.

9. In a selector switch, the combination with line terminals arranged in a series of rows, of a movable member comprising a rotatable shaft and a series of contacts arranged longitudinally of said shaft, one pair of said contacts for each row of terminals, electromagnetic means for rotating said shaft into a position in which any desired pair of contacts is in operative relation to its corresponding row of terminals, and electromagnetic means for moving said member over the terminals until the selected contacts come into electrical engagement with the desired terminals.

10. In a selector switch, the combination with vertical rows of terminals, of a horizontal revoluble member adapted to select a vertical row of terminals, and means for moving said member vertically to connect with a desired terminal in said row.

11. A selector having a flat-faced terminal board with terminal contact pieces arranged in vertical rows upon its face, a brush carrier having several sets of contact brushes, selective means for bringing any one of said sets into operative condition, and means for moving said brush carrier vertically before the board to bring the selected set of brushes into engagement with any of the terminals in its range of movement.

12. In a selector switch, a member comprising a shaft and a series of contact disks mounted in pairs thereon and insulated from said shaft, each member of a pair being connected with the corresponding members of the remaining pairs.

13. In a selector switch, a member comprising a shaft, a series of disks insulatedly mounted on said shaft, the alternate disks being connected together, and contact lips one for each disk, said lips being arranged in pairs angularly disposed with reference to the adjacent pairs.

14. In a selector switch, the combination with a plate having line terminals arranged in pairs in a series of parallel straight rows, of a shaft, a series of disks mounted on said shaft and alternately connected together, contact lips one for each disk, said lips being arranged in pairs angularly disposed with reference to the adjacent pairs, a movable frame upon which said shaft is rotatably mounted, electromagnetic means for rotating said shaft into position in which any selected pair of contact lips is in operative relation with its corresponding row of contacts, rack and pinion mechanism for moving said frame over said plate of line terminals, and electromagnetic mechanism for operating said rack and pinion.

15. In a selector switch, the combination with a rotatably mounted contact member, of a stepping pawl and a retaining pawl for controlling the rotation of said member, a traveling frame upon which said rotatable member is mounted, and a stepping pawl and a retaining pawl for controlling the movement of said frame, said retaining pawl for the rotatable member being normally held out of operative engagement by said retaining pawl for the traveling frame.

16. In a selector switch, the combination with line terminals arranged in pairs in a series of parallel rows, of a rotatably mounted member having contact brushes one pair for each of said rows, corresponding brushes of said pairs being connected together, and said pairs of brushes being adapted to be successively brought into operative relation with their corresponding rows of terminals, a stepping pawl and a retaining pawl electromagnetically operated for controlling the rotation of said member, a frame upon which said member is mounted, said frame being adapted to travel over said rows of terminals, and a stepping pawl and a retaining pawl electromagnetically operated for controlling the movement of said frame.

17. In a selector having a switch member adapted for rotary adjustment and also adapted to be moved bodily after rotary adjustment, a spring-actuated retaining pawl for holding said member in its rotary advance, a second pawl controlling the other movement of said switch member, and a holding magnet having an armature adapted in its attractive movement to bring both pawls into service.

18. In a selector having a movable switch member adapted for rotary adjustment and also adapted to be given a rectilinear movement, the combination with independent retaining pawls for holding said switch member in its respective positions of advance in both movements, of an electromagnet having an armature controlling both of said retaining pawls.

19. In a selector with a movable switch member having both rotary and straight line movements, the combination with a holding magnet, of an armature therefor, a holding pawl for retaining said switch member in its straight line advance, said pawl being thrown into and out of service by said armature, and a second holding pawl for retaining said switch member in its rotary advance, said second pawl being brought into service by the attraction of said armature, and being arranged to be thrown out of service by the returning straight line movement of the switch member when the latter is released by said first pawl.

20. A selector of the two movement type having independent retaining pawls for the different movements, a single holding magnet arranged to bring both pawls into service, one of said pawls being arranged to be thrown out of service by said magnet upon its deënergization, and the other pawl being arranged to be thrown out of service under control of said magnet, by the restoring movement of the selector consequent upon the release of the first pawl.

21. A selector having a flat-faced terminal board and a switch member adapted to travel over the terminals thereon, said board being built up of superposed strips of insulating material, with the contact terminal pieces disposed on edge in vertical slits in the edges of said superposed strips.

In witness whereof, we hereunto subscribe our names this 2nd day of March A. D., 1906.

HOWARD B. HOLMES.
EDWARD B. CRAFT.

Witnesses:
  Roy. T. Alloway,
  E. F. Beaubien.